May 10, 1955     L. L. ERDOS     2,707,784
NAILING HOLDING DEVICE
Filed Aug. 23, 1952
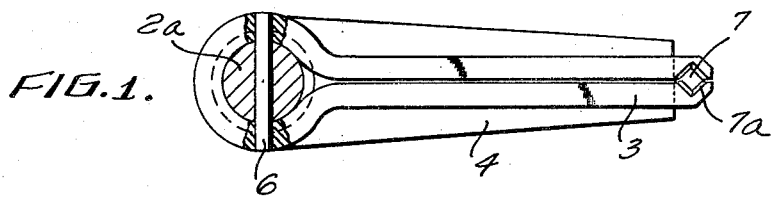
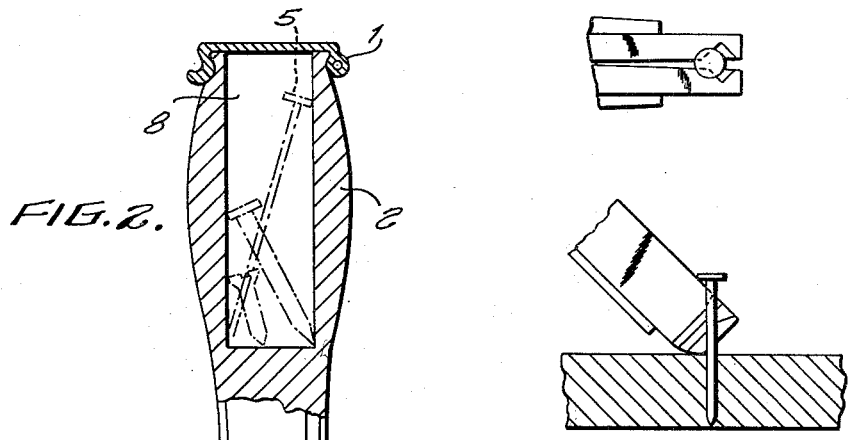
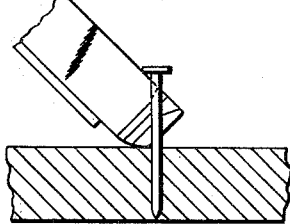
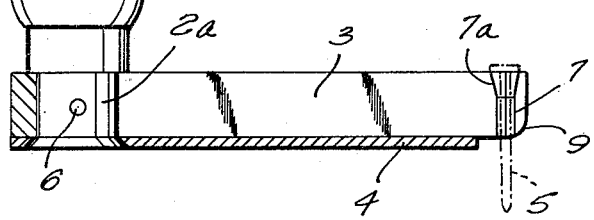
INVENTOR
LESLIE L. ERDOS

United States Patent Office 2,707,784
Patented May 10, 1955

2,707,784

NAILING HOLDING DEVICE

Leslie L. Erdos, Edgemere, N. Y.

Application August 23, 1952, Serial No. 305,934

3 Claims. (Cl. 1—49.8)

This invention relates to devices for holding, hammering and screwing in fasteners such as nails, screws, pins and the like, where due to their shortness, thinness or smallness it would be difficult to hold them in the hand, while manipulating or operating with them.

An object of this invention is to hold fasteners of the above type of any length, any size or any diameter, in any position for quick screwing or hammering in, so that they are stable and straight.

Another object of this invention is to provide a device as characterized hereinbefore, which will be efficient, and simple in operation.

Still other objects of this invention will be apparent as the specification of the same proceeds, or will be pointed out therein, and, among others, I may mention: to provide a device as indicated hereinbefore, which will be simple in construction, comparatively inexpensive to manufacture, and adapted to mass production; wherein efficient and easy means will be provided for holding and disengaging fasteners of the above type; wherein a convenient handle with an opening therein is attached for holding such fasteners in easy reach.

In the drawing forming a part of this specification and accompanying the same:

Fig. 1 is a top view of my invention with the handle shown in section.

Fig. 2 is a sectional view in elevation, showing one arm of the damp with a nail in position and the inside of the handle with compartment for fasteners.

Fig. 3 is a fragmentary sectional view, showing the nailing device in tilted position to illustrate disengaging of fasteners after they are hammered or screwed into the material.

Fig. 4 is a top view of the arrangement shown in Fig. 3.

Referring now to the drawing, my device in its preferred form is shown assembled with a plate generally indicated by the numeral 4 shown in Figs. 1 and 2, for safeguarding the material where a nail or screw is to be driven in, if by mistake operator should hit the nailing device instead of the head of the fastener. This plate 4 is riveted to shaft 2a of handle 2 as shown in Fig. 2. Plate 4 can have a bifurcated end portion for taking out nails or may be entirely omitted if the work is less delicate.

A clamp 3 of elastic material is shown with a loop or opening at one end, the clamp 3 being bent to form two arms resiliently urged together tightly enough together to grip, hold and release fasteners of the above mentioned type. Elastic arms 3 each have two V-shaped slots indicated with the numerals 7 and 7a for gripping such fasteners of any size and diameter. A radius 9 on both arms of spring clamp 3 is added for easy disengagement of the fasteners and to prevent the same from becoming tilted or bent while disengaging them from the device after the fasteners are driven into the material. The V-shaped grooves 7a, somewhat larger than grooves 7, converge gradually toward each other forming a bevel for easy receiving of the fasteners, when the fasteners are pushed by hand into the nailing device.

A handle 2 is mounted in the opening of spring clamp 3 and it is pinned through with pin 6 for holding it in position and for preventing said handle from turning while in operation. In the upper part of handle 2 is a separate compartment, having a cover 1, for holding additional screws, nails, pins and the like 5 therein.

To operate the nailing device, handle 2 is held in one hand and cover 1 is opened to take out the necessary fastener required. The fastener is pushed by hand into the double V-shaped openings 7a and 7, whereby the arms of clamping spring 3 will be automatically spread apart to receive any size or diameter of fastener, the device being adapted to receive fastener of a comparatively great number of different diameters within one and the same openings 7a and 7 while maintaining a tight grip on them. After the fastener is pushed in by hand, a hammer or screw driver can be used while it is held in the nailing device. When the nail, for example, is hammered in, or the screw is screwed in deep enough in the material, the handle 2 can be tilted as shown in Figs. 3 and 4, whereby the screw or nail will gradually enter into the plain sides of the gripping arms 3, ready to be hammered or screwed into the flat material without the aid of any holding device. After the nailing device is removed from the thus driven fastener, arms 3 return to their original closed position, ready to receive other fasteners for holding the same.

While the double V-shaped openings 7 and 7a are provided to facilitate easy insertion of fasteners by hand, these types of openings could also be used on two or more differently sized nailing devices for very small or very large fasteners or for having a nailing device and screwing device separately, if desired.

What I claim as new and want to protect by Letters Patent of the United States, is:

1. A device for holding a fastener such as a nail, screw, pin and the like, comprising, in combination, a holding member including a pair of elongated substantially parallel clamping members having upper and lower edge faces, free end faces, and opposite contacting faces, said clamping members being connected to each other at one end and being resiliently urged into engagement with each other along said opposite contacting faces, said clamping members being formed at the other end of said holding member with opposite complementary recesses in said contacting faces for receiving and resiliently clamping a fastener therein, the corners formed by said lower edge faces and the free end faces of said clamping members being of rounded form so that the holding member may be tilted thereon; and a handle member connected to said holding member at said one end thereof for manipulating said holding member, whereby a fastener may be held by said holding member in position to be driven into an object and the holding member readily removed from the fastener after it is thus driven.

2. A device for holding a fastener such as a nail, screw, pin and the like, comprising, in combination, a holding member including a pair of elongated substantially parallel clamping members having upper and lower edge faces, free end faces, and opposite contacting faces, said clamping members being connected to each other at one end and being resiliently urged into engagement with each other along said opposite contacting faces, said clamping members being formed at the other end of said holding member with opposite complementary recesses in said contacting faces for receiving and resiliently clamping a fastener therein, the corners formed by said lower edge faces and the free end faces of said clamping members being of rounded form so that the holding member may be tilted thereon; a handle member connected to said holding member at said one end thereof for manipulating said holding member; and an elongated protective plate member connected to said holding member and extending substantially normal to said contacting faces substantially in the plane of the lower edge faces of said clamping members, whereby a fastener may be held by said holding member in position to be driven into an object and the holding member readily removed from the fastener after it is thus driven.

3. A device for holding a fastener such as a nail, screw, pin and the like, comprising, in combination, a holding member including a pair of elongated substantially parallel clamping members having upper and lower edge faces, free end faces, and opposite contacting faces, said clamping members being connected to each other at one end and being resiliently urged into engagement with each other along said opposite contacting faces, said clamping members being formed at the other end of said holding member with opposite complementary recesses in said contacting faces for receiving and resiliently clamping a fastener therein, the corners formed by said lower edge faces and the free end faces of said clamping members being of rounded form so that the holding member may be tilted thereon; and a handle member connected to said holding member at said one end thereof extending upwardly therefrom for manipulating said holding member, whereby a fastener may be held by said holding member in position to be driven into an object and the holding member readily removed from the fastener after it is thus driven.

References Cited in the file of this patent

UNITED STATES PATENTS

| | | |
|---|---|---|
| 383,516 | De Puy | May 29, 1888 |
| 778,924 | Umsted | Jan. 3, 1905 |
| 1,426,249 | Bochonok | Aug. 15, 1922 |
| 1,525,413 | Pearson | Feb. 3, 1925 |
| 1,688,445 | Williams | Oct. 23, 1928 |
| 2,452,332 | Siptrott | Oct. 26, 1948 |
| 2,648,066 | Ingraham | Aug. 11, 1953 |